United States Patent [19]

Cain

[11] Patent Number: 4,801,791

[45] Date of Patent: Jan. 31, 1989

[54] PENDULOUS COMPENSATOR VIBRATORY MOTION DAMPING SYSTEM

[75] Inventor: Gary L. Cain, New Carlisle, Ohio

[73] Assignee: Spectra-Physics, Inc., San Jose, Calif.

[21] Appl. No.: 77,214

[22] Filed: Jul. 24, 1987

[51] Int. Cl.$^4$ ................................................. G01J 1/20
[52] U.S. Cl. ..................................... 250/201; 250/230
[58] Field of Search ............... 250/203 R, 201 R, 230; 73/430

[56] References Cited

U.S. PATENT DOCUMENTS

| | | | |
|---|---|---|---|
| 3,093,741 | 6/1963 | Meyer | 250/230 |
| 3,836,260 | 9/1974 | Ulyanov et al. | 250/230 |
| 4,185,239 | 1/1980 | Filloux | 250/230 |
| 4,559,445 | 12/1985 | Hedin et al. | 250/203 R |
| 4,659,219 | 4/1987 | de Fleurieu et al. | 250/230 |

OTHER PUBLICATIONS

"A Simple Low Frequency Current Source", McNeill *American J. of Physics*, vol. 33 #11, 11/1965, p. 965.

Primary Examiner—David C. Nelms
Assistant Examiner—Crystal Cooper
Attorney, Agent, or Firm—Killworth, Gottman, Hagan & Schaeff

[57] ABSTRACT

A system for dampening vibratory motion of a pendulous compensator in a laser beam projector includes a beam splitter which diverts a portion of a laser beam deflected by a mirror mounted on a cantilever beam of the compensator, and a photocell device having a pair of photodetectors positioned to receive the diverted laser beam portion and sense oppositely varying proportions thereof corresponding to the displacement of the position of the deflected laser beam. Two output signals are produced corresponding in magnitudes to the respective proportions of the diverted laser beam portion sensed by the photodetectors. A difference amplifier takes the difference of these output signals to produce a first electrical signal having a polarity and magnitude representing the direction and amount of motion of the cantilever beam. A derivative circuit takes the derivative of the first electrical signal with respect to time to produce a second electrical signal having a polarity and magnitude representing the direction and rate of movement of the cantilever beam. An electrical coil, having a magnet reciprocally movable relative thereto which is linked to the cantilever beam, produces a magnetic force related in polarity and magnitude to the second signal to cause the magnet to resist the vibratory movement of the cantilever beam.

20 Claims, 2 Drawing Sheets

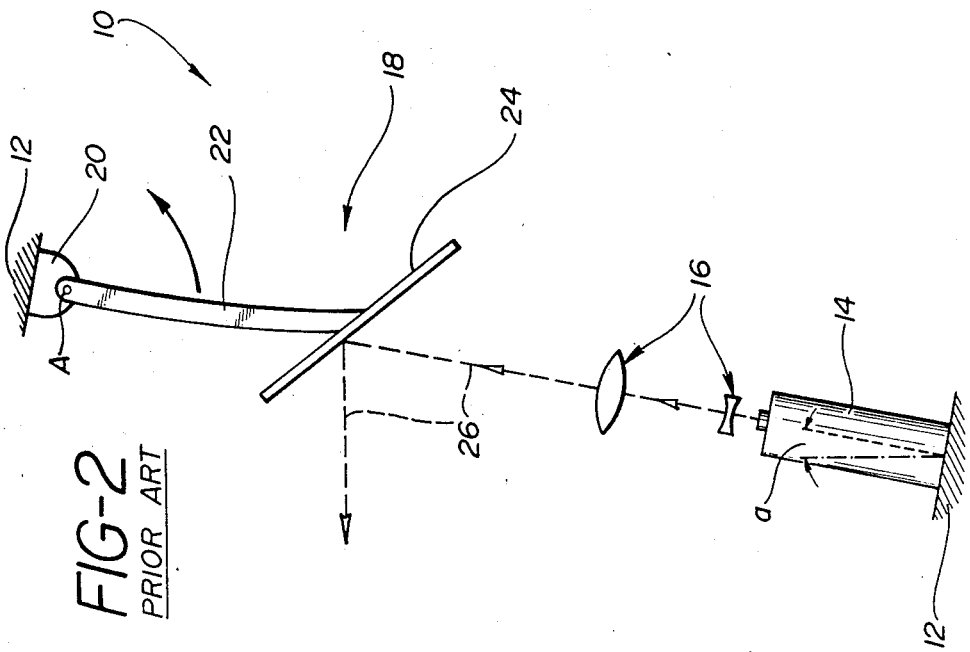
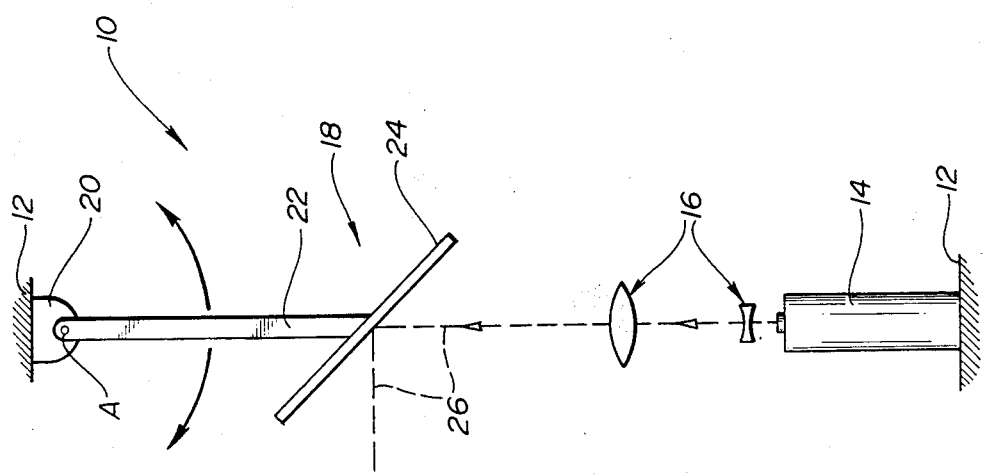

PENDULOUS COMPENSATOR VIBRATORY MOTION DAMPING SYSTEM

BACKGROUND OF THE INVENTION

The present invention generally relates to pendulous compensators and, more particularly, to a system for dampening vibrations, and especially low velocity vibratory motion, of a pendulous compensator.

Laser beam systems have been employed in numerous surveying and construction applications. For instance, laser beam projectors are available which will generate a horizontal reference beam. In order to ensure that the reference laser beam emanating from a vertically-oriented laser source in the projector will continue to point in the desired horizontal direction even if the laser source becomes tilted from a true vertical orientation, it is possible to employ a pendulous compensator in the projector.

A simplified schematical diagram of a conventional laser beam projector 10 is shown in FIG. 1 herein. Basically, the projector 10 includes a casing 12, a laser beam source 14, expander lenses 16 and a pendulous compensator 18. The pendulous compensator 18 has a mounting bracket 20, a cantilever beam 22 mounted to and suspended downwardly from the bracket 20 for movement relative thereto within a plane parallel to the plane of the drawing and oriented orthogonal to the wider dimension of the beam 22, and a laser beam reflecting mirror 24 fixedly attached at a forty-five degree angle to the lower end of the cantilever beam 22. The laser source 14 and the mounting bracket 20 are fixedly attached to the casing 12 in such alignment that a laser beam 26 projected upward from the laser source 14 would pass through the attachment point A of the cantilever beam 22 on the mounting bracket 20 if the cantilever beam 22 and mirror 24 were removed and also would pass through the bending plane of the cantilever beam 22.

Therefore, when the projector 10 is placed in a true vertical orientation, the cantilever beam 22, which due to gravity always assumes a true vertical orientation, extends in alignment with the laser beam 26 being projected vertically upward from the laser source 14. The laser beam 26 first passes through the expander lenses 16 which expand and then collimate the beam before it reaches the mirror 24. The mirror 24, oriented at forty-five degrees to the vertical, then reflects the beam 26 in the desired horizontal direction within the pivotal plane of the cantilever beam 22.

Even if the laser beam projector 10 becomes slightly tilted away from the vertical, it is desired that the laser beam continue to deflect in the horizontal direction. The pendulous compensator 18 operates to ensure such result. As seen in an exaggerated form in FIG. 2, the casing 12 and thus the laser beam 26 as it emerges from the laser source 14 are oriented at an angle relative to the vertical. However, the cantilever beam 22 of the pendulous compensator 18, which due to the effect of gravity always bends toward a true vertical orientation, is now displaced counterclockwise about its mounting point A from the line of the emergent laser beam 26 through one-half the angle of tilt which exactly compensates for the angular tilt of the casing 12. In accordance with known principles of geometry and optics, the laser beam 26 then continues to be reflected in the desired horizontal direction.

The compensatory operation of a pendulous compensator as just described is satisfactory under conditions where it is not subject to vibrations. However, errors arise from oscillation of the cantilever beam due to vibrations which commonly occur in surveying and construction environments. Pneumatic and eddy current damping arrangements have been used in the past in an attempt to nullify the effects of vibrations, but both arrangements have their drawbacks. Pneumatic damping arrangements are somewhat difficult to adjust to provide the correct amount of damping. Oftentimes, over or under dampening of the pendulous compensator results. Eddy current dampening arrangements have not proven to be very useful for low velocity damping.

Consequently, in view of the shortcomings of the above-mentioned prior art dampening arrangements, there is still a need for a technique to overcome the deleterious effects of vibrations on pendulous compensators.

SUMMARY OF THE INVENTION

The present invention provides a pendulous compensator vibratory motion dampening system designed to satisfy the aforementioned need. The vibratory motion dampening system of the present invention is provided in combination with a laser beam projector which includes a stationary laser source adapted to generate a laser beam and a pendulous compensator adapted to deflect the laser beam. The dampening system comprises: first means for sensing the displacement of the position of the deflected laser beam relative to a desired predetermined position to produce a first electrical signal representing the vibratory bending movement of the pendulous compensator producing the displacement of the deflected laser beam; second means coupled to the first means for receiving the first electrical signal and processing the same to produce a second electrical signal representing the rate of the bending movement of the pendulous compensator producing the displacement of the deflected laser beam; and third means coupled to the second means and linked to the pendulous compensator for receiving the second electrical signal and translating the same to produce a force sufficient to resist the bending movement of the pendulous compensator producing the displacement of the deflected laser beam.

More particularly, the first means includes: means, such as a beam splitter, disposed in the path of the deflected laser beam for diverting a portion thereof; and a photocell device having a pair of photodetectors positioned for receiving the diverted portion of the deflected laser beam and sensing oppositely varying proportions thereof corresponding to the displacement of the position of the deflected laser beam relative to its desired predetermined position. The photocell device produces a pair of output signals corresponding in magnitudes to the respective proportions of the diverted laser beam portion sensed by the pair of photodetectors. The first means further includes a pair of amplifiers, each respectively connected to one of the pair of photodetectors, for receiving the respective output signals to produce amplified output signals. Also, the first means includes a difference amplifier for receiving the amplified output signals and taking the difference of the same to produce the first electrical signal having a polarity and magnitude representing the direction and amount of bending movement of the pendulous compensator producing the positional displacement of the deflected laser beam.

Still further, the second means includes a derivative circuit for receiving the first electrical signal and taking the derivative thereof with respect to time to produce the second electrical signal having a polarity and magnitude representing the direction and rate of movement of the pendulous compensator. The third means includes an electrical element, such as a coil, coupled to the second means, and a magnetic element, such as a magnet, reciprocally movable relative to the electrical coil and linked to the pendulous compensator. The electrical coil produces a magnetic force proportional in polarity and magnitude to the second electrical signal to cause the magnet to resist the movement of the pendulous compensator producing the positional displacement of the deflected laser beam.

Additionally, the dampening system includes fourth means coupled to the first means and the laser source for receiving the first electrical signal and determining whether or not the first means has sensed an excessive amount of displacement of the position of the deflected laser beam relative to its desired predetermined position. When an excessive amount of displacement has been sensed, the fourth means produces a latched signal for disabling the laser source and is reset when the instrument is releveled.

Accordingly, it is an object of the present invention to provide a vibratory motion dampening system for maintaining a laser beam directed in a horizontal direction; to provide a system for dampening vibratory motion of a pendulous compensator; to provide a system for dampening low velocity vibratory motion; and to provide a means for disabling the power supply of the laser source if excessive bending motion of the pendulous compensator is detected.

BRIEF DESCRIPTION OF THE DRAWINGS

FIG. 1 is a simplified schematical diagram of a prior art laser beam projector aligned in a true vertical orientation, which projector was described earlier in the Background section herein;

FIG. 2 is another schematical diagram of the laser beam projector of FIG. 1 showing it tilted through an angle "a" away from vertical.

DETAILED DESCRIPTION OF THE PREFERRED EMBODIMENT

Figure 3:
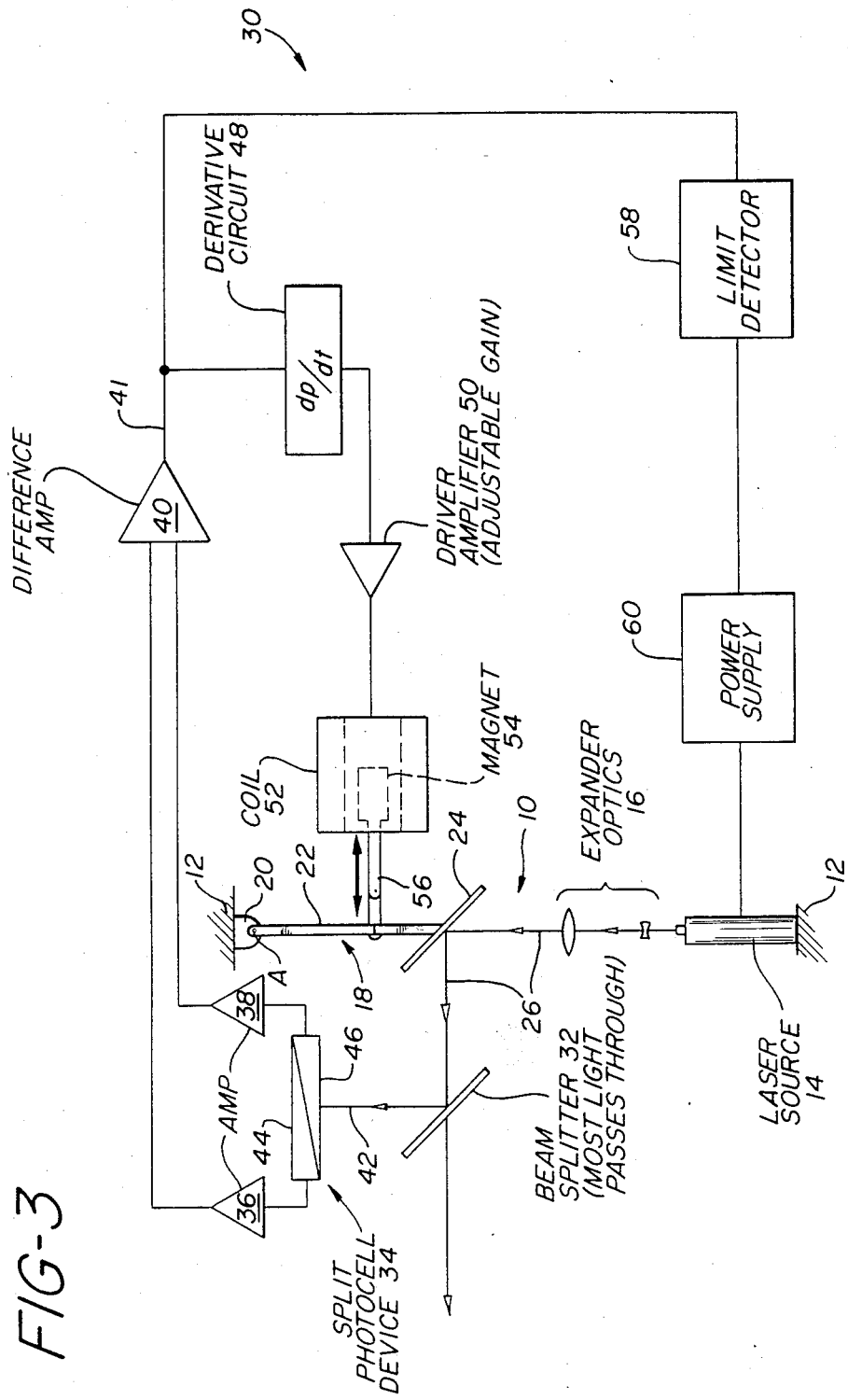
FIG. 3 is a schematical diagram of the electromechanical vibratory motion dampening system of the present invention being associated with the laser beam projector of FIG. 1.

Reference is now made to FIG. 3 of the drawings which illustrates a pendulous compensator vibratory motion dampening system, generally designated 30. The damping system comprises the preferred embodiment of the present invention and is shown in conjunction with the prior art laser beam projector 10 and specifically with the pendulous compensator 18 thereof. The laser beam projector 10 with which the dampening system 30 is combined includes the stationary laser source 14 adapted to generate the laser beam 26 and the pendulous compensator 18 adapted to deflect the laser beam, as described heretofore.

The system 30 for dampening vibratory motion of the pendulous compensator 18, which is primarily environmentally-induced, includes a first group of components which coact together to sense the displacement of the position of the deflected laser beam 26 relative to a desired predetermined or horizontal position and produce a first electrical signal related thereto. The first electrical signal has a polarity and magnitude representing the direction and amount of the vibratory bending movement of the cantilever beam 22 of the pendulous compensator 18 which produced the displacement of the deflected laser beam.

More particularly, the first group of components preferably includes a beam splitter 32, a photocell device 34, a pair of amplifiers 36,38 and a difference amplifier 40. The beam splitter 32 is disposed in the path of the deflected laser beam 26 for diverting a small fractional portion 42 thereof. Parenthetically, the beam splitter 32 can be a microscope slide since very little of the beam need be diverted. The photocell device 34 has a pair of photodetectors 44,46 positioned for receiving the diverted portion 42 of the deflected laser beam 26. The photodetectors 44,46, being triangular in shape, are fitted together such that they are struck at the same time by the diverted beam portion 42.

Oppositely varying proportions of the beam 42 are sensed by the photodetectors 44,46 corresponding to the displacement of the position of the deflected laser beam 26 away from its desired horizontal position. That is, varying amounts of light are sensed by the two photodetectors 44,46 depending upon the position along the length of the photocell device 34 which is illuminated by the diverted beam portion 42. For example, if the deflected laser beam 26 is centered at its desired horizontal position, then each of the photodetectors 44,46 nominally senses the same amount of light. However, if the deflected laser beam 26 is displaced vertically above its desired horizontal position, the photodetector 44 senses a greater proportion of the diverted beam and the bottom photodetector 46 senses a lesser proportion thereof. Then, the photodetectors 44,46 produce respective output signals which correspond in magnitude to the respective proportion of the diverted laser beam portion 42 sensed by the photodetectors.

The amplifiers 36,38 of the first group of components are respectively connected to the outputs of the top and bottom photodetectors 44,46 for receiving the respective output signals therefrom to produced amplified output signals. The amplified output signals are supplied to the difference amplifier 40 which takes the difference between them to produce the aforementioned first electrical signal on line 41. The first signal will have a polarity and magnitude determined by the difference between the magnitudes of the two amplifier output signals which, as stated earlier, is representative of the direction and amount of bending movement of the cantilever beam 22 of the pendulous compensator 18.

Also, the system 30 includes a second group of components which receives the first electrical signal and processes the same to produce a second electrical signal representing the rate of the bending movement of the pendulous compensator 18. More particularly, the second group of components includes a derivative circuit 48 and a driver amplifier 50. The derivative circuit 48 is connected at its input to the output of the difference amplifier 40 for receiving the first electrical signal and taking the derivative thereof with respect to time to produce the second electrical signal. This second signal is a dampening signal which has a polarity and magnitude related to the direction and rate of bending movement of the cantilever beam 22 of the pendulous compensator 18, respectively. Thus, slow movement of the pendulous compensator 18 produces a low output signal from the derivative circuit 48, whereas fast movement produces a larger output. The driver amplifier 50 is connected to the output of the derivative circuit 48 and is operable to adjust the magnitude of the second signal produced by the circuit and the degree of dampening ultimately affected.

Further, the system 30 includes a third group of components coupled to the driver amplifier 50 and linked to the pendulous compensator 18 for receiving the second electrical signal and translating the same to produce a force sufficient to resist bending movement of the pendulous compensator. More specifically, the third group of components includes an electrical coil 52 coupled to the driver amplifier 50 and a magnet 54 reciprocally movable relative to and within the coil 52 and linked by a linkage arm 56 to the cantilever beam 22 of the pendulous compensator 18. The coil 52 produces a magnetic force proportional in magnitude and related in polarity to the second electrical signal to cause the magnet 54 to resist the vibratory bending movement of the cantilever beam 22.

Finally, the system 30 includes a fourth group of components which are also coupled to the difference amplifier 40, as well as the laser source 14. This group of components receives the first electrical signal and determines whether or not the first signal is of a magnitude which indicates that the photocell device 34 has sensed an excessive amount of displacement of the position of the deflected laser beam 26 relative to its desired horizontal position. Specifically, the fourth group of components includes a latched limit detector 58 connected to the difference amplifier 40, and a power supply 60 connected between the laser source 14 and the limit detector 58. If the photocell device 34 senses an excessive amount of displacement, as determined by the latched limit detector 58, then a signal is produced by the detector 58 which shuts off the power supply 60 and disables the laser source 14. The latched limit detector is manually reset when the instrument is manually releveled within its compensation range.

It should be understood that the components of the system 30 have been represented in schematical form since they are individually well known in the art. To depict them in greater detail would only serve to increase the complexity of the explanation of the system 30 without adding to its clarity.

Having thus described the pendulous compensator vibratory motion dampening system of the present invention in detail and by reference to a preferred embodiment thereof, it will be apparent that modifications and variations are possible without departing from the scope of the invention defined in the appended claims.

What is claimed is:

1. In combination with a laser beam projector including a stationary laser source adapted to generate a laser beam and a pendulous compensator adapted to deflect the laser beam, a system for dampening vibratory motion of the pendulous compensator, comprising:
   first means for sensing the displacement of the position of the deflected laser beam relative to its desired predetermined position to produce a first electrical signal representing the vibratory movement of the pendulous compensator;
   second means, coupled to said first means, for receiving said first electrical signal and producing a second electrical signal representing the rate of movement of the pendulous compensator; and
   third means, coupled to said second means and linked to the pendulous compensator, for receiving said second electrical signal and translating the same to produce a force sufficient to resist the movement of the pendulous compensator.

2. The system of claim 1 in which said first means includes:
   means disposed in the path of the deflected laser beam for diverting a portion thereof; and
   a photocell device having a pair of photodetectors positioned for receiving the diverted portion of the deflected laser beam and sensing oppositely varying proportions thereof corresponding to the displacement of the position of the deflected laser beam relative to its desired predetermined position to produce a pair of output signals corresponding in magnitudes to the respective proportions of the diverted laser beam portion sensed by said pair of photodetectors.

3. The system of claim 2 in which said diverting means is a beam splitter.

4. The system of claim 2 in which said first means further includes a pair of amplifiers each respectively connected to one of said pair of photodetectors for receiving said respective output signals to produced amplified output signals.

5. The system of claim 2 in which said first means still further includes a difference amplifier for receiving said output signals and taking the difference of the same to produce said first electrical signal having a polarity and magnitude representing the direction and amount of movement of the pendulous compensator producing the positional displacement of the deflected laser beam.

6. The system of claim 1 in which said second means includes a derivative circuit for receiving said first electrical signal and taking the derivative thereof with respect to time to produce said second electrical signal having a polarity and magnitude representing the direction and rate of movement of the pendulous compensator.

7. The system of claim 6 in which said third means includes:
   an electrical element coupled to said second means; and
   a magnetic element reciprocally movable relative to said electrical element and linked to the pendulous compensator, said electrtical element for producing a magnetic force proportional in polarity and magnitude to said second electrical signal to cause said magnetic element to resist the vibratory movement of the pendulous compensator producing the positional displacement of the deflected laser beam.

8. The system of claim 1, further comprising:
   fourth means coupled to said first means and the laser source for receiving said first electrical signal and determining whether said first means has sensed an excessive amount of displacement of the position of the deflected laser beam relative to its desired predetermined position said fourth means producing a signal for disabling the laser source when its is determined that an excessive amount of displacement has been sensed.

9. The system of claim 7, in which said fourth means is a latching limit detector connected to said first means and a power supply connected between said laser source and said latching limit detector.

10. In combination with a laser beam projector including a laser source adapted to generate a laser beam and a pendulous compensator having a cantilever beam with an optical element mounted thereon to deflect the laser beam, a system for dampening vibratory motion of the cantilever beam and the optical element mounted thereon, comprising:

first means for sensing the displacement of the position of the deflected laser beam relative to a desired predetermined position to produce a first electrical signal representing the vibratory movement of the cantilever beam producing the displacement of the deflected laser beam;

second means, coupled to said first means, for receiving said first electrical signal and processing the same to produce a second electrical signal representing the rate of the movement of the cantilever beam producing the displacement of the deflected laser beam; and third means, coupled to said second means and linked to the cantilever beam, for receiving said second electrical signal and translating the same to produce a force sufficient to resist the movement of the cantilever beam.

11. The system of claim 10 in which said first means includes:

means disposed in the path of the deflected laser beam for diverting a portion thereof; and a photocell device having a pair of photodetectors positoned for receiving the diverted portion of the deflected laser beam and sensing oppositely varying proportions thereof corresponding to the position of the deflected laser beam, thereby producing a pair of output signals corresponding in magnitudes to the respective proportions of the diverted laser beam portion sensed by said pair of photodetectors.

12. The system of claim 11 in which said diverting means is a beam splitter.

13. The system of claim 11 in which said first means further includes a pair of amplifiers each respectively connected to one of said pair of photodetectors for receiving said respective output signals to produced amplified output signals.

14. The system of claim 11 in which said first means still further includes a difference amplifier for receiving said output signals and taking the difference of the same to produce said first electrical signal having a polarity and magnitude representing the direction and amount of movement of the cantilever beam producing the positional displacement of the deflected laser beam.

15. The system of claim 10 in which said second means includes a derivative circuit for receiving said first electrical signal and taking the derivative thereof with respect to time to produce said second electrical signal having a polarity and magnitude representing the direction and rate of movement of the cantilever beam.

16. The system of claim 15 in which said third means includes:

an electrical coil coupled to said second means; and a magnet reciprocally movable within said electrical coil and linked to the cantilever beam, said electrical coil for producing a magnetic force proportional magnitude and of appropriate polarity to said second electrical signal to cause said magnet to resist the movement of the cantilever beam producing the positional displacement of the deflected laser beam.

17. The system of claim 16 further comprising a driver amplifier connected between said electrical element and said second means and being operable to adjust the magnitude of said second electrical signal.

18. The system of claim 10, further comprising:

fourth means coupled to said first means and the laser source for receiving said first electrical signal and determining whether said first means has sensed an excessive amount of displacement of the position of the deflected laser beam relative to its desired prodetermined position and to produce a latched signal for disabling the laser source when it is determined that an excessive amount of displacement has been sensed.

19. The system of claim 18, in which said fourth means includes a latching limit detector connected to said first means and a power supply connected between said laser source and said latching limit detector.

20. In combination with a laser beam projector including a stationary laser source adapted to generate a laser beam and a pendulous compensator having a cantilever beam with an optical element mounted thereon to deflect the laser beam, a system for dampening vibratory motion of the cantilever beam and the optical element mounted thereon, comprising:

a beam splitter disposed in the path of the deflected laser beam for intercepting and diverting a portion of the deflected laser beam;

a photocell device having a pair of photodetectors positioned for receiving the diverted portion of the deflected laser beam and optically sensing oppositely varying proportions thereof corresponding to the displacement of the position of the deflected laser beam, said pair of photodetectors producing a pair of output signals corresponding in magnitude to the respective proportions of the diverted laser beam portion sensed by said pair of photodetectors;

a difference amplifier coupled to said pair of photodetectors for receiving the output signals and taking the difference of the same to produce a first electrical signal having a polarity and magnitude representing the direction and amount of movement of the cantilever beam;

a derivative circuit coupled to said difference amplifier for receiving said first electrical signal and taking the derivative thereof with respect to time to produce a second electrical signal having a polarity and magnitude representing the direction and rate of movement of the cantilever beam;

an electrical coil coupled to said derivative circuit; and a magnet means, reciprocally movable relative to and disposed within the electrical coil and linked to the cantilever beam, said electrical coil producing a magnetic force proportional in polarity and magnitude to said second electrical signal to cause said magnet to resist the movement of the cantilever beam.

* * * * *